Aug. 20, 1968    H. J. CARTER    3,397,573
OCEANOGRAPHIC APPARATUS
Filed Oct. 23, 1965    5 Sheets-Sheet 1

INVENTOR.
HOWARD J. CARTER
BY
Kane, Dalsimer, Kane & Smith
ATTORNEYS

Aug. 20, 1968 H. J. CARTER 3,397,573
OCEANOGRAPHIC APPARATUS
Filed Oct. 23, 1965 5 Sheets-Sheet 2
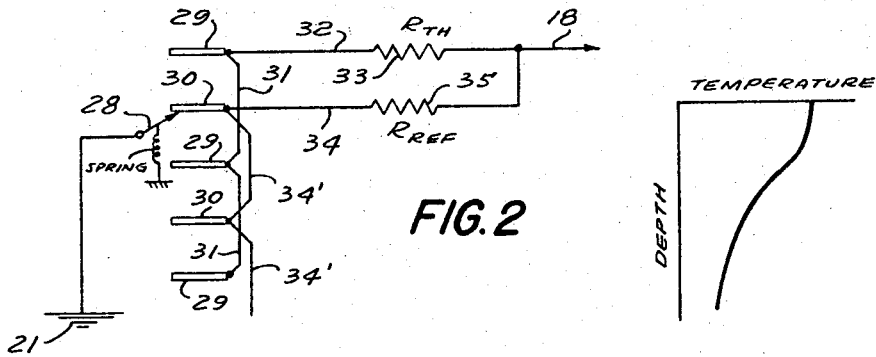
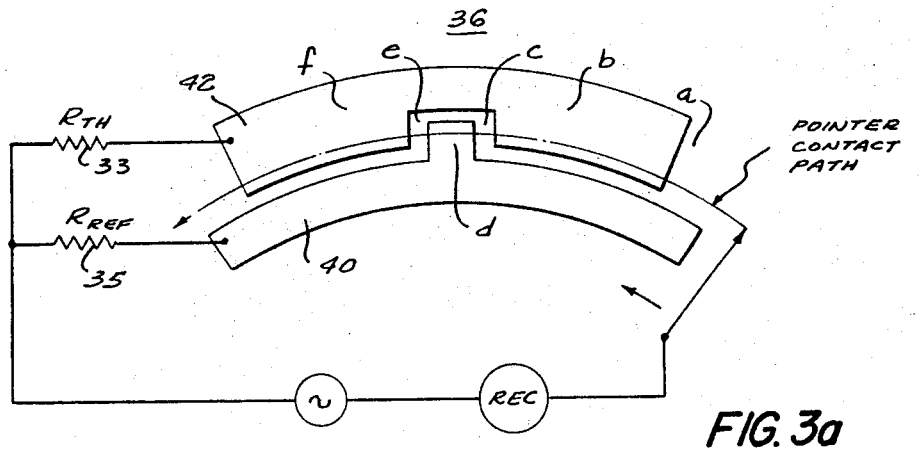
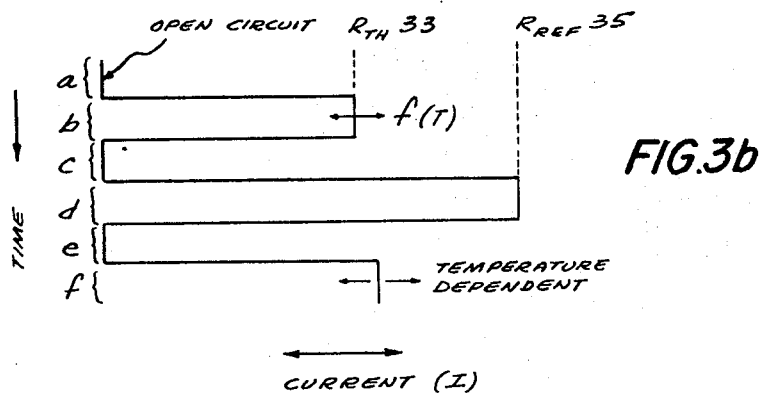
INVENTOR.
HOWARD J. CARTER
BY
Kane, Dalsimer, Kane & Smith
ATTORNEYS

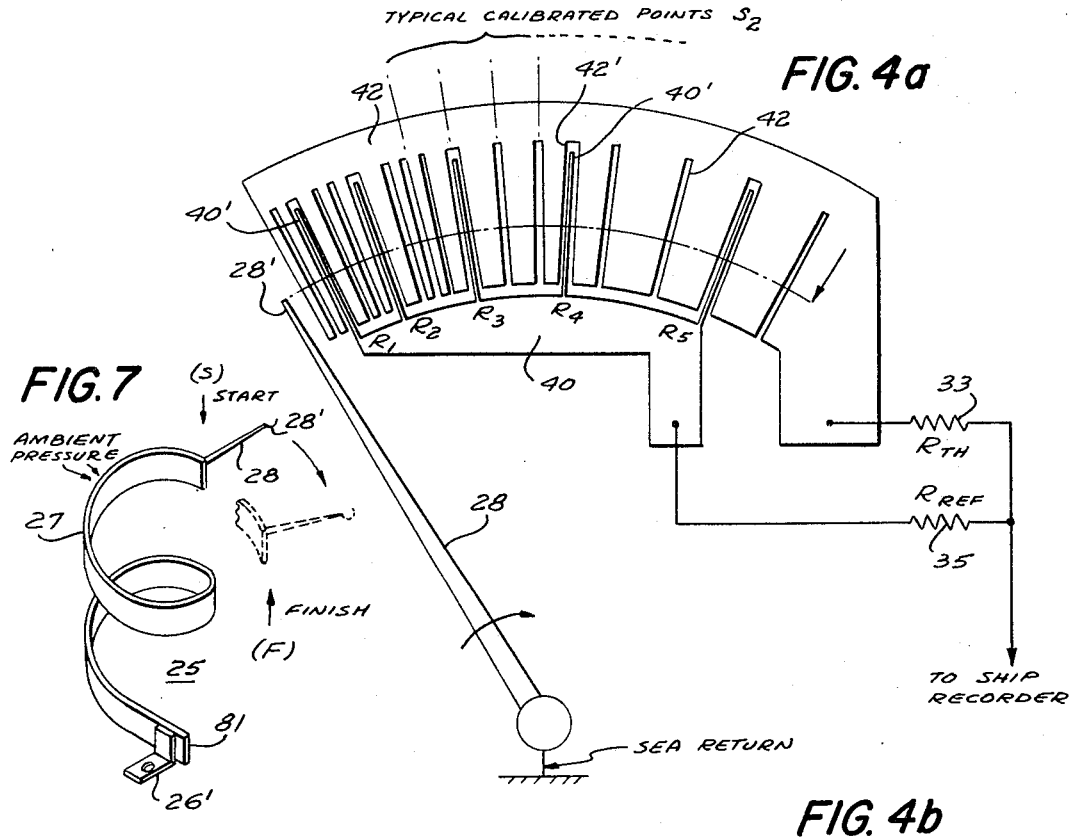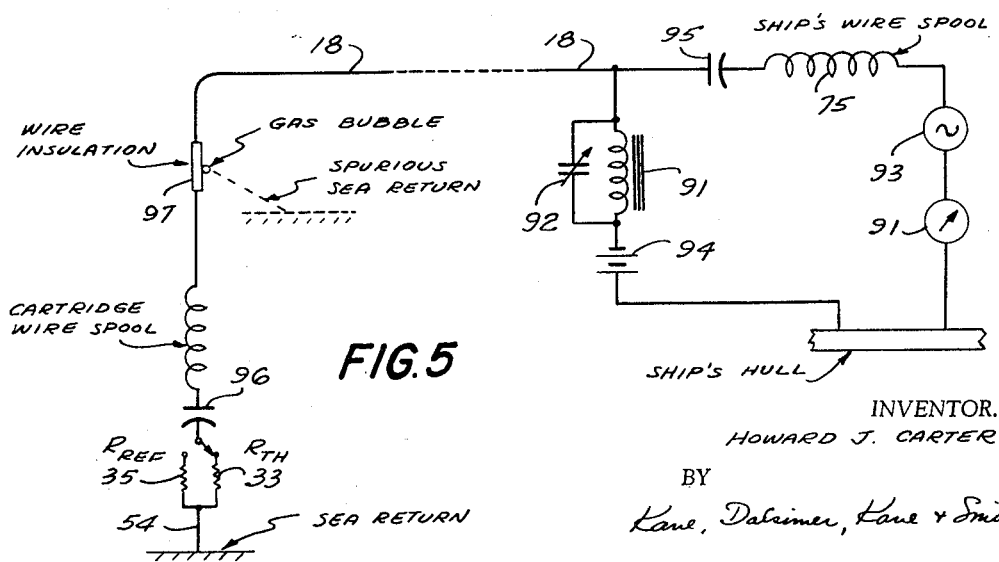

Aug. 20, 1968  H. J. CARTER  3,397,573
OCEANOGRAPHIC APPARATUS
Filed Oct. 23, 1965  5 Sheets-Sheet 4
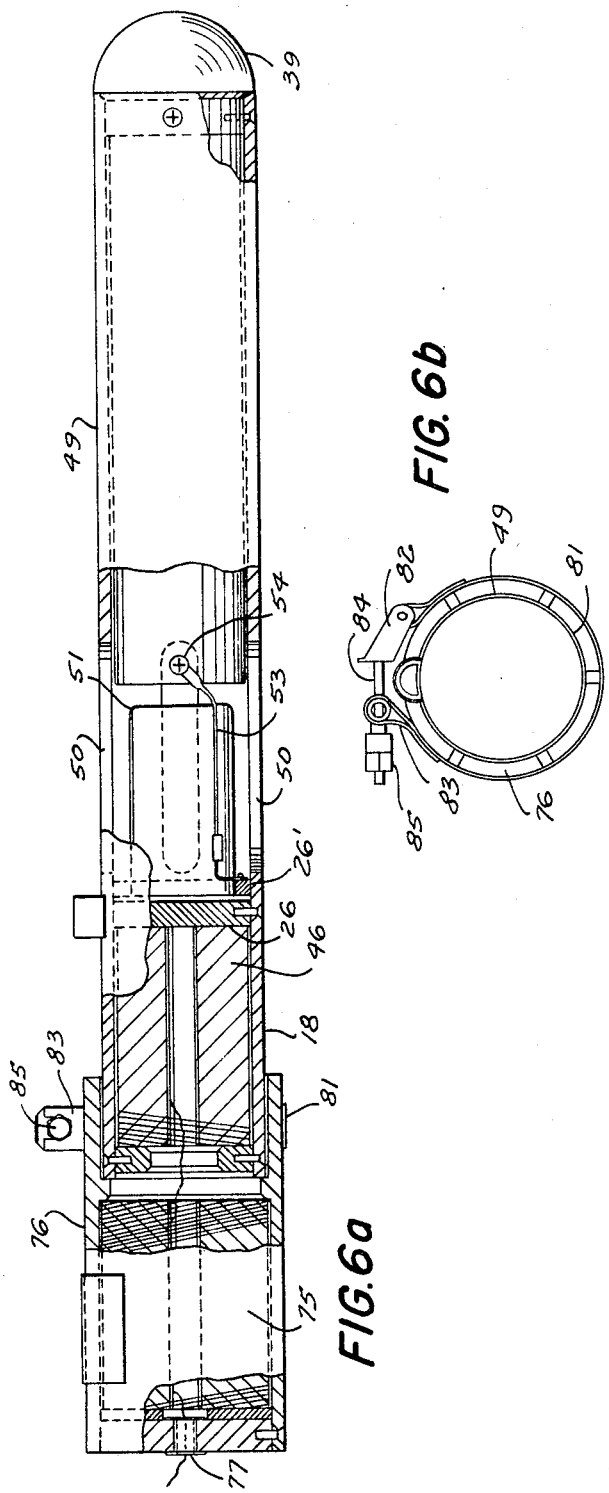
FIG.6a
FIG.6b
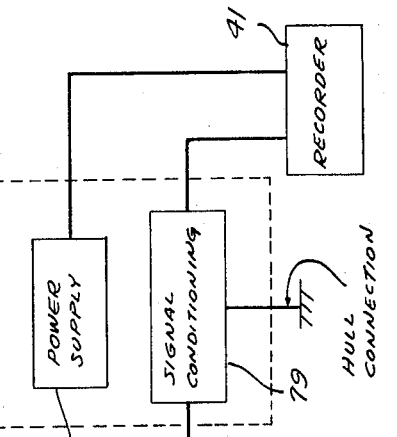
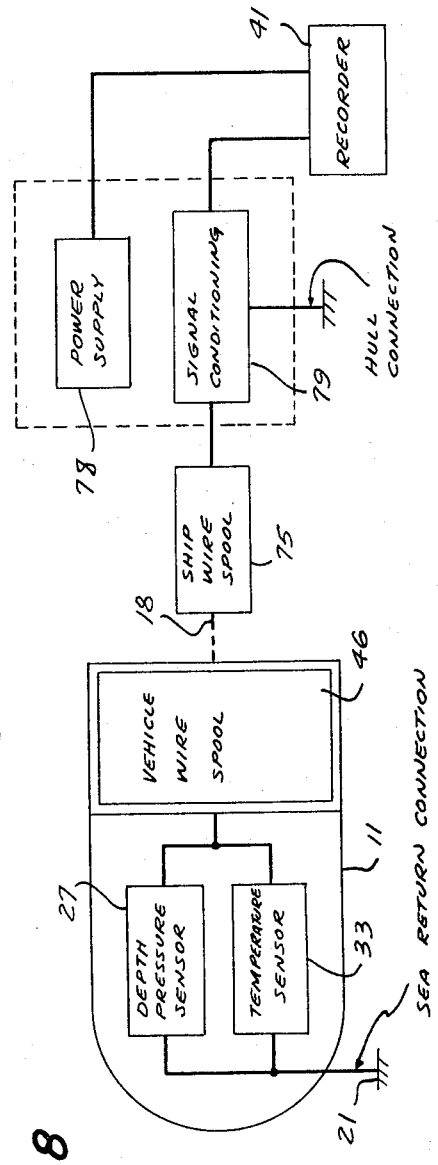
FIG.8
INVENTOR.
HOWARD J. CARTER
BY
Kane, Dalsimer, Kane & Smith
ATTORNEYS

3,397,573
OCEANOGRAPHIC APPARATUS
Howard J. Carter, 2149 Anniversary Lane,
Newport Beach, Calif. 92660
Filed Oct. 23, 1965, Ser. No. 502,964
13 Claims. (Cl. 73—170)

ABSTRACT OF THE DISCLOSURE

An oceanographic apparatus for sensing and measuring temperature and depth in which a single telemetering signal is modulated as to amplitude in accordance with the sensed temperature and is interrupted to form pulses in accordance with the measured depth.

---

This invention is directed to oceanographic apparatus of the type frequently referred to as an expendable bathythermometer. A device of the type to be described herein is used for sensing and measuring temperature, as well as the depths within a water body at which such sensing and measuring is done.

The invention will be explained and considered in respect of a type of expendable vehicle which is appropriately instrumented with suitable sensors to permit measurements of temperature and depths to be made within the selected water body. The mechanism functions and is appropriately controlled through association with passive circuit elements contained within its expendable portion.

In oceanographic investigations, it is, at times, highly important that full information be available as to the depth of the water above the ocean or other water floor bed. For other investigations, it is not necessary to know the actual water depth. It is, however, a factor of great importance to be able to determine the water temperature at different depth levels.

To make measurements of the foregoing characteristics, the expendable vehicle or cartridge forming a part of the invention is controllably released in any desired way. One conventional release is provided by manually dropping the vehicle or cartridge into the water body. The drop may be made either from a stationary platform or from a moving ship travelling over the water surface at either a known or an unknown rate. The released vehicle, which, at times, is known as a "fish," commences to sink through the water body to its bed or floor immediately. The sinking rate may previously have been experimentally determined, or the rate of sinking may even be unknown. In either case as the dropped vehicle sinks following its release into the water body various measurements which will be considered are normally made with reference to a fixed datum level. By the apparatus and system here to be described a record is obtained during the sinking period. This record is usually preserved by recording it on a suitable data recorder but this is not a necessary criterion of the invention. Also, even if the sinking rate is non-uniform, it will not interfere with the accuracy of the measurements made. The invention is so constituted that the record obtained is an accurately established indication of the conditions obtaining at all times.

The expendable vehicle is equipped with the suitable sensing elements to measure each of temperature and depth. Such measuring instruments within the vehicle provide a control of electrical signaling information which is supplied by way of a connecting wire communication line established between the sinking vehicle and a surface station, e.g., the station from which the vehicle is dropped. In the normal operation, there is a wound spool of electrically conducting wire contained within the vehicle to be paid-out as the vehicle drops through the water body. Where the drop is made from a stationary point the wire is usually contained only within the vehicle and has one end connected to the drop point. Where the drop is made from a moving vessel a second wire spool is located on the vessel. The wire of the two spools is connected. For purposes of description it may be assumed that a wire-feed spool is located at the drop point (or on the ship from which the cartridge is dropped) and the wire of each spool is connected, as above stated. Then, so assumed, the wire from each spool starts to unwind substantially simultaneously following the dropping of the vehicle into the water body. At the drop station (here considered as the ship) the connecting wire line is arranged to energize and control the operation of the component to make a record of the data supplied to it by the connecting wire line, with the data being the sensings of the falling vehicle. One end of the connecting wire line is adapted to be attached in an electrical relationship with the sensing instrumentalities so that, dependent upon the instantaneously obtained information, different signal pulses or modulations will be conveyed between the vehicle and the recording station. The return path for the developed currents is through the water body into which the vehicle is dropped. In all instances, the conducting wire (preferably copper wire) should be insulation covered in order that the sea-return path may be used to complete the circuit.

The sensing vehicle, after being released or dropped into the water surface, follows generally a free-falling substantially vertical sinking path from the point of entrance to the water body bed. The length of electrically conducting wire which should be wound onto the supply spool to be fed out from the falling vehicle is determined by the depth to which it is desired that the vehicle should make measurements while sinking. In cases where the vehicle is dropped from a moving station, such as a ship travelling through the water body, the length of electrically conducting wire required should take into account the distance the ship travels from the point of dropping the vehicle during the measuring period.

Various factors may determine the rate at which the vehicle sinks to the bed of the water body. The release of the conducting wire from both the vehicle itself and from the surface area from which it is dropped, is facilitated by a spool-winding formation which permits the conducting wire to be withdrawn with minimum difficulty and freedom from snagging. Although the wire should be insulation covered there should be complete freedom from any adhesive or sticky substance which would otherwise tend to retain the wire storage spools in any particular shape during the wire dispensing period. The wire size should be small but should have a resistance which contributes no more than a fixed uncertainty to the measurements. While temperature variations can exert some change on the wire resistance, the wire resistance itself is such a small part of the total resistance that variations of this small part can readily be ignored as negligible. It is important, however, that the wire should be sufficiently heavy and strong to withstand the force of the vehicle drop. Also, since it is important that electrical leakage be avoided, it should be heavy enough to be available in a moderate price range, it being noted that very fine wires are fragile and are difficult to obtain at low cost if there is low leakage.

In the preferred form of the invention the expendable vehicle is of generally cartridge-like shape. In addition to the wire spool supply for the connection between the vehicle and the ship, the vehicle includes accurately calibrated components to provide the sought-for measurements of depth and changing thermal gradients throughout the water body.

The hydrodynamic characteristics of the vehicle normally are consistent with a selected dropping rate of the vehicle in which the sensing units are included. The vehicle itself is made sufficiently small in size and light enough in weight to permit small ships to store the components in considerable quantities. Packaging and storing of the vehicles is simplified by the streamlined construction, as will be explained. The supply spool of wire is contained within the cartridge-like component to be withdrawn through an opening centrally located in the upper end of the vehicle. The opening permits water access to the interior of the vehicle but this is of no significance as far as the withdrawal operation is concerned. There is also positioned, within the vehicle (usually at its forward end) a suitable nose weight adapted to cause falling or dropping through the water at a selected rate. Because of the length of the vehicle, the construction insures that the vehicle will always assume a generally vertical position as it falls within a water body. A suitable instrumentality to measure pressure is also contained within the vehicle. In one particular preferred form, the pressure sensing component is similar in type to the well-known Bourdon gauge. It is housed within a pliable covering or cannister capable of applying the external pressure through a fluid usually having a lower specific gravity than that of the water through which the vehicle or cartridge falls. The center of gravity of the vehicle should remain below the center of buoyance as far as possible in order to insure a stable vertical fall. The hydrodynamic stability considerations, briefly mentioned above, dictate that the pressure measuring instrument should be generally toward the rear of the instrument.

The wall of the vehicle has a plurality of elongated circumferentially spaced slots extending longitudinally thereof. These slots permit water to enter into the vehicle in order that the pressure within the water body is made effective within the vehicle itself. Due to the slot size the interior of the vehicle is substantially free of dynamic pressure errors due to the velocity at which the vehicle moves through the water as it drops. The entry of the water within the vehicle permits the external water pressure to be applied to a flexible or pliable wall housing the pressure sensing component. With these conditions, the falling or dropping vehicle is always subjected to the increasing presure of the water upon it as it falls from the surface toward the bed of the water body. Not only is a pressure sensing effect achieved but temperature sensing is also registered as the temperature sensing device is supported upon the submersible vehicle in such fashion and location as to be subject to receiving a maximum "washing" effect of the water slipstream as the vehicle sinks. Temperature sensing continues as the vehicle sinks to various sinking depths. The sensing is achieved normally by way of the well-known thermistor-type component. The "thermistor" is a well-known type of component which may be described very briefly as a unit whose resistance is subject to change with temperature.

In a preferred form, the "thermistor" may be a plastic insulated component located on the periphery of the vehicle in a region where it will have the highest possible dissipation constant and the lowest time constant. The "thermistor" normally provides extremely small initial tolerance and, yet, it has long term stability.

The combination of the "thermistor" and the pressure sensing device is included in a sub-assembly of the instrument which is connected to the wire-supply spool within the vehicle as a whole. It is important that the sensors shall be of a character which will control a suitable electrical output to indicate changes and yet, shall be of high stability. It is due to this factor that the temperature measured is related to water depth. The pressure sensor should be so located within the vehicle that any introduced dynamic errors caused by the slipstream effect of the vehicle falling within the water body shall be of negligible effect.

The signal circuit between the vehicle and the base location is, on the one hand, by way of connecting electrically conducting wire which is fed out, as already described, and, on the other hand, through the water itself. In one form of vehicle the pressure indicating Bourdon-unit has its indicating arm or pointer included in the electrical circuit to the recording point. The pointer is adapted to trace over a commutating segment and the combination supplies electrical current to the external circuit. The elastic and flexible covering in which the Bourdon-unit is suitably supported is non-leaking and contains a low specific gravity fluid, usually oil, as will later be discussed. The pointer of the gauge when rested upon the commutating section is deflected thereacross as the external water pressure increases with increasing depth.

Indications of depth and temperature, as provided by the sensing units, are then supplied to the external circuit as the pointer arm movement sweeps over an arcuate path with pressure changes to traverse alternately sections of the commutator which are connected with the "thermistor" and a reference section, with a non-conducting segment between each change. The different sections of the commutator are each electrically conducting and each is serially arranged relative to a source of alternating current and a recording instrumentality. The commutator segment, adapted to be used to supply depth information, has a resistance of fixed value serially connected therewith. The temperature sensing section includes the "thermistor" which, with temperature change, has the effect of placing a variable resistance in series therewith. An open-circuit state is reached each time the pointer traces an insulating or non-conducting region between the other sections. The result is that the record produced at the vehicle-dropping station is a trace which has limiting regions extending between fixed open-circuit and reference datum lines. Between these, the trace progressively changes as a function of temperature changes. The spacing between successive representations of one of the fixed indications, such as an open-circuit state, will provide the depth indication since the angular change in the pointer is due to pressure change effects transferred to the Bourdon-gauge. With the angular separation of the commutator segments being known the arcuate pointer movement can at once be translated to a measure of pressure change.

The vehicle comprises, in most cases, a central chamber serving the dual function of linking the vehicle ends to aid in insuring a substantially vertical drop effect through the water body and also, by virtue of elongated fluid entry ports in the vehicle wall, to provide a fast-flooding component which aids in reducing an erratic weaving type of motion. With the vehicle containing the wire adapted to be fed from the spool as the vehicle sinks, there is a connection between the disposed wire of the vehicle and the wire spool of the ship (or other dropping point) whereby wire is fed out from the dropping location. The length of this wire portion unwound from the spools is determined, in the case where the drop is from a ship, by the ship's motion away from the discharge scene or dropping point and the depth to which the vehicle sinks. The discharged vehicle as a whole is preferably of a cartridge-type appearance having a length usually of about 16 or 17 inches and a diameter approximately one-fifth to one-fourth the length, it being understood that the mentioned dimensions are illustrative rather than limiting.

With the foregoing general features in mind, the invention has among its principal aims and objects those providing a readily disposable vehicle for measuring and sensing both temperature and depth and which can be carried on shipboard and stored with a minimum space requirement and which is sufficiently inexpensive to permit a single-time use with non-recovery.

In normal operation, a vehicle of the foregoing type connects to the ship only through the wire withdrawn from the supply spools (and the wire remaining unwound from the spools) of each of the disposable vehicle and the ship supply, with the closing circuit connections made from the cartridge through the water body and the ship's hull. The signal conditioning is made possible by appropriate powering apparatus carried on the ship or other dropping station. In practice, a relatively low voltage alternating current of an appropriate frequency is supplied into the wire component through a supply source on the ship. A suitable direct current bias voltage is likewise normally superimposed on the low voltage alternating current for reasons which will later be explained in detail. Recordings of the happenings and measurements within the disposable vehicle are provided by a recording unit normally having a record strip adapted to be advanced at a known constant rate relative to a marking instrumentality controlled by the signal variations introduced over the connecting wire line between the vehicle and the ship. The electrical variations are transmitted over the connecting wire line between the vehicle and the ship and through the use of special commutating components, as already described.

As an adjunct to the operation and sensing and in order to establish the amount of wire required on the feed spools, a suitable nomograph is usually also prepared. The nomograph is used to provide an indication of the known or experimentally established sinking rate of the vehicle in feet per second, as well as the allotted dropping depth from the water surface to the bed or dropping depth within the water body. Then, by indicating and having information as to the ship's speeds in knots per hour or in feet per second, for instance, it is possible immediately to obtain without calculation information of the total wire required between the ship and the vehicle in its final measuring and released positions, as well as to indicate the distance along the surface of the water travelled by the ship in the time between vehicle dropping and the final measurements.

Many and various other objects and further advantages of the invention will immediately suggest themselves to those skilled in the art to which the invention is directed when the following description and claims are considered in conjunction with the attached drawings intended to serve as an aid in explaining the nature of the invention as well as its particular preferred components.

In the drawings:

FIG. 1a is a schematic representation of a ship at the water surface discharging a measuring vehicle of the character to be described with the general relative positions of the ship and the vehicle establishing the relative vehicle and ship positions substantially at the moment of vehicle impact with the water; FIG. 1b indicates the passage of each of the ship and the vehicle at a time shortly later; and FIG. 1c is a showing at a later time than that of FIG. 1b to show the falling vehicle substantially at the floor or body of the ocean;

FIG. 2 is a schematic showing of the pressure and temperature sensors' effect upon the connecting wire link with the ship proper; the representation being intended to establish through the aid of the schematically represented contactor the fashion by which contact is successively and alternately made through the pressure and temperature sensing elements (with interruptions when passing between contact points) to be translated back into an analog representation with the graphical portion of the figure showing schematically a curve wherein the temperature is plotted against depth;

FIG. 3a is a schematic showing of a portion of a commutating device used to switch between the two types of sensing in the vehicle;

FIG. 3b is a schematic showing of the finally produced curve, thereby to indicate the relationship between pressure and temperature;

FIG. 4a is a sketch to show the commutating section of the pressure and temperature gauge;

FIG. 4b is a sketch to show the code or pattern by which sections of the commutator are identified;

FIG. 5 is a schematic representation of the circuitry by which measurements are made between the dropping point and the dropped vehicle;

FIG. 6a is a schematic sectional showing of the vehicle or cartridge particularly adapted for use in practicing the invention described;

FIG. 6b is a section through FIG. 6a on line 6b—6b;

FIG. 7 is an isometric schematic of the Bourdon tube of the depth sensor;

FIG. 8 is a schematic and blocked diagram showing of the operational system as utilized to sense the pressure and temperature conditions.

Figure 1A:
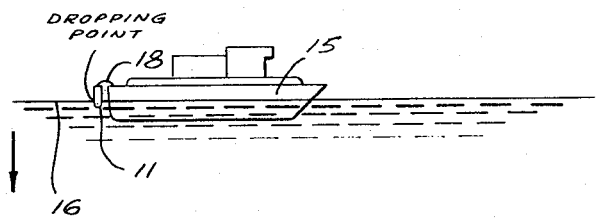

Making specific reference now to the drawings and first to FIG. 1a, the cartridge or vehicle 11 is indicated as being detached from the ship 15 by way of release from the ship into the water 16 and meeting the water surface at approximately the indicated dropping point. The connecting wire line 18 is schematically represented between the vehicle and the ship. The ship's motional distance along the path is depicted by the arrow.

Figure 1B:
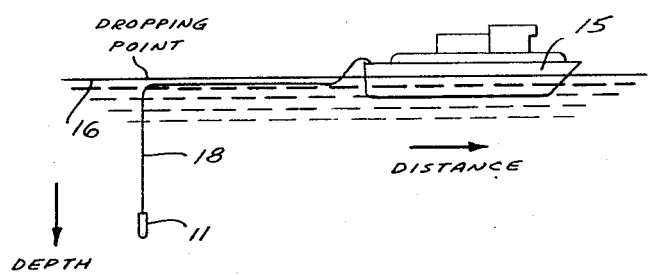
Figure 1C:
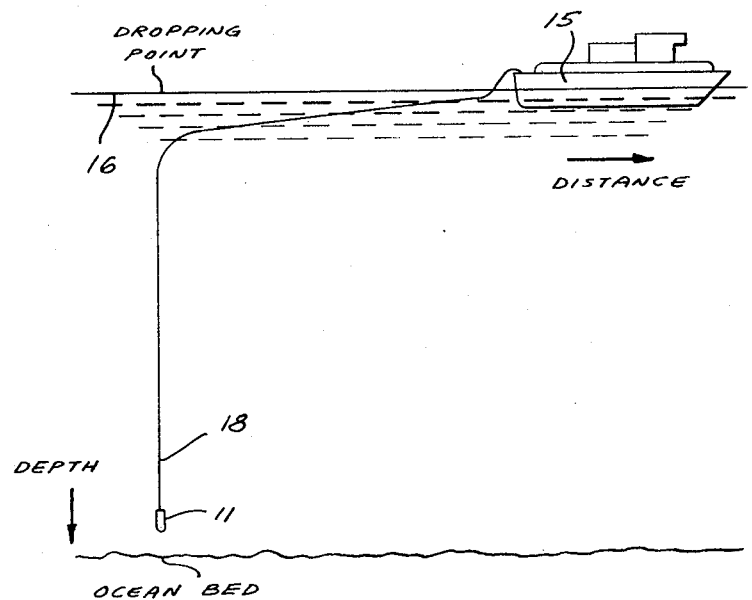

In FIG. 1b, the condition is portrayed at a slightly later time period with the vehicle having had an opportunity to sink below the water surface 16. FIG. 1c shows similar conditions with the vehicle 11 substantially coming to rest at the ocean bed, floor or bottom (or, this may be assumed as the depth for which measurements are desired). In the time between vehicle discharge, as depicted by FIG. 1a, and the time of vehicle motion arrest as the vehicle 11 contacts the ocean bed or floor 21 (or sinks to any selected depth), such as that limited by the length of wire on the spool contained in the vehicle, various and numerous measurements have been made.

As will be evident from the showing of FIG. 6a, in particular, the vehicle 11 contains within its body the pressure sensing component schematically represented at 25. This unit is substantially in the form of the well-known Bourdon-gauge. Briefly, it comprises a strip or tube of metal (see FIG. 7) adapted to change its length between a coiled condition and a state more closely approximating a straight line path although, of course, this latter condition never actually exists despite the fact that the diameter of the coil does change with pressure changes.

The lower end of the Bourdon gauge unit 25 is supported on a base 26 by a support bracket 26'. The bracket preferably supports a fixed end portion of the gauge which is removed from the outer free end and not subject to turning.

For the moment, it may prove helpful to refer briefly to FIG. 7 which depicts the tubular structure of the Bourdon gauge control. The gauge is composed of a coiled tubular structure 27, as indicated. The coiled member may preferably be flattened, as shown to provide a more or less strip-like unit with a hollow interior. Within the flattened and sealed member 27, which is air-tight there is a gas filling maintained at any desired reference pressure. Both ends of the tubular structure 27 are sealed. The gas is introduced, illustratively, through an end 81 prior to sealing. With the presurization internally of the coiled member 27, it will be apparent that with the end 81 connected to the support bracket 26, the free end of the tube 27 to which the pointer 28 is attached will be in its "unwound" state due to the initial presure filling of gas. Ambient pressure, with increasing external pressurization effects as transmited through the flexible covering 51 (FIG. 6a) in which the Bourdon gauge is held progressively start to increase external pressure relative to the initial state. Finally, if sufficient external pressure is applied, an equalization between external and internal pressure occurs. The contact arm 28' moves in the direction of the arrow as the ambient pressure due to the depths to which the Bourdon is sunk tends to increase because of the reduced pressure differential between the outside and inside of the tube 27. The final position F is reached when the internal and external pressures are equal. In this instance, it may be appreciated that the final pressure point F is that point which the tube pointer would assume should the tube 27 at all times be open to the atmosphere. The inside and the outside pressures in such a case would be equal at the start. With the inside pressure initially higher, the external pressure must be increased for the equalization to occur.

The general effects resulting from the assembly are depicted by the schematic representation of FIG. 2. In the FIG. 2 showing an increase of pressure and change in the coil diameter causes the pointer 28 to move from the start position S1 to the final position F and is permitted to contact successive contact points 29 and 30 (as the commutator sections of FIG. 3). All similarly numbered contact points 29 of FIG. 2 connect together, and, likewise, all similarly numbered contact points 30 connect together. The contact points identified as 29 connect together through the connecting conductors 31. Conductor 32 connects the end terminal 29 to one terminal of a "thermistor" 33 (schematically shown). The second terminal connects to the connecting wire link 18 spanning the distance from the vehicle to the dropping unit, such as the vessel or ship 15.

Similarly, the contact points 30 which are connected together by conductor 34' connect through conductor 34 to one terminal of a resistance 35. This resistance 35 is of a reference value which remains substantially fixed regardless of the depth to which the vehicle is able to sink. The second terminal of the resistance 35 connects to the connecting line 18. The pointer 28 of the Bourdon gauge 25 moves between the contact points 29 and 30 of the contact point series. When the pointer moves across the different contact points a connection is established alternately to the "thermistor" 33 or to the reference standard 35.

Simultaneously with the dropping of the cartridge 11 from the ship, a series of records of the derived information, later to be explained, are initiated for recording by the recording unit 41 (FIG. 8) so that a final permanent record of the vehicle and its effect is produced. This will be explained particularly in connection with the diagrams of FIGS. 3 and 4.

In the meantime, reference may be made to the vehicle itself as illustratively depicted in some further detail by FIG. 6. As already explained, the vehicle is generally a small relatively inexpensive instrumentality adapted to be connected through the conducting wire 18 to a shipboard analog data recorder (schematically represented at 41 in FIG. 8). The trailing wire 18 is connected to signal conditioning circuits (not shown) capable of transmitting over it the indications of temperature, as already explained, as varied by the changing resistance of the "thermistor" 33 with depth changes. The wire is stored generally within one end of the vehicle in spool formation 46 so as to be fed out from the interior of the spool, with the interior of the spool thus becoming larger and larger as more wire is removed. Change in position between contact indicative of one or the other of two chosen positions is provided, as already mentioned, by the pointer 28.

The temperature sensing component 33 is usually carried on the outer surface of the vehicle, as schematically shown by FIG. 6. The pressure sensing component 25 is located within the vehicle and is there subjected to pressures corresponding to those effective in the water body at whatever depth the vehicle happens to be located at the moment. The forward end of the vehicle is commonly known as the nose point 34. It has a weight 39 in the forward portion. The weight provides a suitable gravitational force to cause the vehicle to drop at the desired rate and also insures stability during the drop. It is frequently desirable to use the weighted nose region to provide the electrical connection between the sensing component 25 for pressure and the sensing component 33 for temperature and the water. The increased stability provided by the nose weight controls the vehicle to such an extent that the vertical position is held as it falls through the water. Between the spool 46 and the nose weight 39 there is normally, but not essentially, arranged a relatively large chamber 49 having a multiplicity of peripheral slots 50 extending longitudinallly and circumferentially spaced about the chamber 49. The sensing or measuring components are preferably located near the slotted section of the vehicle wall so that the slots 50 permit the water to enter into the chamber to fill the component. In this way, pressure is introduced in the gauge unit 25. The construction tends to stabilize the component in its motion downwardly thereby precluding substantially any weaving or wobbling.

The wire spool contained in the upper end of the vehicle is usually a form of lightweight copper wire carrying an insulating covering. The covering is wound essentially in a self-supporting configuration without the use of adhesives or other constituents which would tend to help the wire spool to retain its shape as the wire is paid out following the time between launch and reaching the final depth within the ocean body. During the dropping time, the wire remains attached at one end to the sensing instrumentalities within the vehicle and connected with the recording instrumentalities on the ship at the other end.

The pressure sensing component in the form of the already described Bourdon gauge 25 is carried within the vehicle interiorly of a flexible covering depicted as 51. Within the flexible covering 51 housing the pressure gauge, it is customary to provide a fluid filling usually in the form of oil. The peripheral wall slots 50 ensure that pressure substantially equal to that of the water at the instantaneous position of the vehicle is applied to the oil filling within the flexible wall container 51. This provides a static pressure chamber into which the oil-filled pressure chamber is positioned. Then, when changes in pressure are introduced as changing depths are reached, the increasing pressure is applied upon the Bourdon gauge. This increasing pressure is essentially a static pressure substantially free of dynamic changes resulting from the velocity at which the cartridge drops through the water. The pointer-contactor 28 (see FIGS. 2 and 3) is progressively moved between the contact strips 29 and 30 in sequence, thereby to establish a connection of the trailing wire 18 alternately through the resistance of the "thermistor" and a fixed reference resistance 35. Pressure as recorded and effective upon the Bourdon gauge 25 is normally calibrated by a suitable form of tester component (not shown), illustrative of which is a Ruska secondary standard deadweight tester. The "thermistor" 33 is normally calibrated with laboratory thermometers whose calibration is directly traced to the standards established by the National Bureau of Standards.

For a further understanding, reference may now be made to FIG. 6a. The cartridge 19 has an internal connection provided between the noseweight 39 and the trailing wire 18 which is provided by the conductor 53 connecting to the vehicle and to the noseweight by way of the connecting point 54. This is conventionally shown also by FIG. 5 where the lower end of the connection 54 is indicated to "sea return." This is to represent the conductivity existing through the water path and leading back to the ship's hull.

At the launch time, the vehicle is assembled with its cap portion arranged to surround the upper end through which the wire 18 is withdrawn from the spool. The cap section 76, as already stated, also has a wire spool 75 within it. The spool 75 connects with the wire 18 and the vehicle. The outer section of the cap has a contacting plate 77 which connects to the recording circuit. Prior to launching, the cap and vehicle section are held together by a clamp ring shown more particularly in FIG. 6b. This clamp unit may comprise a band or the equivalent 81 surrounding the cap 76. The band connects to an end fastener 82 at one end and at the other end is secured to a generally U-shaped fastening section 83. A pivoted arm 84 secured to the fastener 82 may be positioned and temporarily locked in the U-shaped slot when the fastening nut 85 is tightened. Release of the cap from the vehicle proper is provided by disengaging the arm 84 from the fastening section 83. This can be seen more particularly from FIG. 8a with the movement of the component being sufficient to disengage the arm from the slot into which it is held.

Considering now FIGS. 4a and 4b, and noting that these constitute a somewhat detailed exemplification of the structure represented by FIGS. 2 and 3a, the pointer 28 moves across the toothed and recessed conducting sections 40 and 42 with its contactor point 28' being adapted to contact all of the conducting sections in sequence. The circuit to which the pointer connects is interrupted as each passage over an insulating section occurs. Following this movement, the switching pattern can be made unique by variance of the relative positions and shape of the teeth and slots.

This has been indicated by the pattern of FIG. 4b. Illustratively, as the pointer 28 moves across the toothed sections marked $R_1$, $R_2$, $R_3$, $R_4$ and $R_5$ there is a unique relationship existing because of the fact that at such times as contact is with regions 40' the transmission between the vehicle and the ship is an indication of the reference value as contrasted to an indication of the temperature while passing over any of the sections 42. The insulating sections provide spacings by introducing an open circuit condition, similar to that indicated by FIG. 3.

If considered, illustratively, by the sections marked $S_1$ and $S_2$, the fashion of determining the relative pressure can be appreciated even if certain sections of data are missing. Ready identification would be almost impossible with a completely uniform pattern because it would be extremely difficult to sense the precise instantaneous pointer location. Illustratively, if the first section labeled $S_1$ happened to be missing from the record resulting from the drop of the vehicle and the final record consisted only of those portions shown by the designation $S_2$, adequate information would still be available. The switching pattern in section $S_2$ is generally unique and as can be appreciated from a consideration of FIGS. 4a and 4b jointly. The first reference marked $R_3$ in the section $S_2$ can be distinguished readily from some other reference such as $R_1$ or $R_2$, as well as from $R_4$ or $R_5$, because of the sections following. It is thus possible to obtain an increase in the reliability of the system because some data may always be obtained even if the record is partially destroyed. Should the data recording occur in a precisely uniform manner, loss of a certain portion of the record would prevent positive interpretation and therefore, practically preclude correct pressure calibration. In this operation, it is necessary to match the sequence of circuit interpretations with the sequence of calibration points which are supplied on a calibration chart. Consequently, both relative temperature identifications and different pressures (i.e., water depth) at which they occur become readily apparent.

By FIG. 5, consideration has been given to the bathythermometer bias circuit. On shipboard or at any other dropping point, the combination of the iron core inductance 91, together with its parallel capacitor 92, form a tuned circuit. This circuit is designed to have an extremely high impedance at the frequency of the alternating current source 93 which supplies current to the line or wire conductor between the dropping point and the vehicle per se. Under the circumstances, no significant current from the alternating current source is shunted by the parallel tuned circuit through the battery 94 back to the measuring instrument 41. On the other hand, the current which may flow from the battery 94 is blocked from the measuring instrument by the capacitor 95 and also by the capacitor 96 which is located within the dropping instrument. The important factor is to prevent a direct current from flowing through the measuring instrument and also from flowing through the "thermistor" 33 within the vehicle. On the other hand, to obtain the desired measurements, it is important that the alternating current flow through the "thermistor." While it will be recognized that the wire spools which are contained within the vehicle and at the dropping point constitute inductive elements this is not a significant parameter in the circuit operation.

In the diagram of FIG. 5, there is schematically represented the effect of a spurious sea return path which may be caused by a break in the insulation covering 97 which surrounds the complete length of wire 18. In the sketch, only a limited length of insulation of represented for purposes of convenience but, as was explained above, the insulation should cover the complete length of the wire. In the event that the insulation is defective or that leakage occurs through the insulation to the center conductor during a period of measurement, the wire itself constitutes a cathode element so that at any point where a break in the wire insulation or leakage occurs a conductive path may result through the sea water. It is apparent that disassociation of the water occurs soon after any leak develops. This gives rise to a bubble which blocks, at least for a short time, the break in the insulation. Until any time when the bubble can form, which is a process that at times takes several seconds, the break in the insulation permits both a direct current from the battery and an alternating current from the source 93 to flow from the sea water return to the instrument 41. This may permit instantaneous errors in the "thermistor" temperature indications to occur for a few seconds prior to the removal of the cause by the bubble formation. Such errors in the "thermistor" temperature tend to cause characteristic bumps in the record but these are readily distinguished from the transient changes caused by the action of the water on the commutator.

Considering further the diagram of FIG. 5, and also bearing in mind the schematic representation of FIG. 8, the circuitry provides for linearizing the "thermistor" temperature characteristic by a bridge circuit formed and designed to be excited with an alternating current. This is important because, if the bridge circuit were to be excited with a direct current, it would be impossible to distinguish between currents caused by the "thermistor" resistance variation and currents caused by the electrolytic action in the sea water reacting with the ship's hull and other metallic electrodes present in the circuit. In the normal form of circuitry, it is desirable to couple from the bridge circuit to an amplifier, the amplifier being tuned to eliminate the effect of any disturbance caused by either the source of alternating current which may be present or which may be coupled into the ship's hull into the measuring bridge circuit through the sea return. Thus, the amplifier, if used in combination with the recorder 41, would be tuned to the frequency of the source 93. In most instances, it is desirable for convenience of recording to convert the alternating current to a direct current voltage through a converter and filter in order to record on a strip recording voltmeter. These instruments are generally located in the schematically represented recorder.

Figure 9:
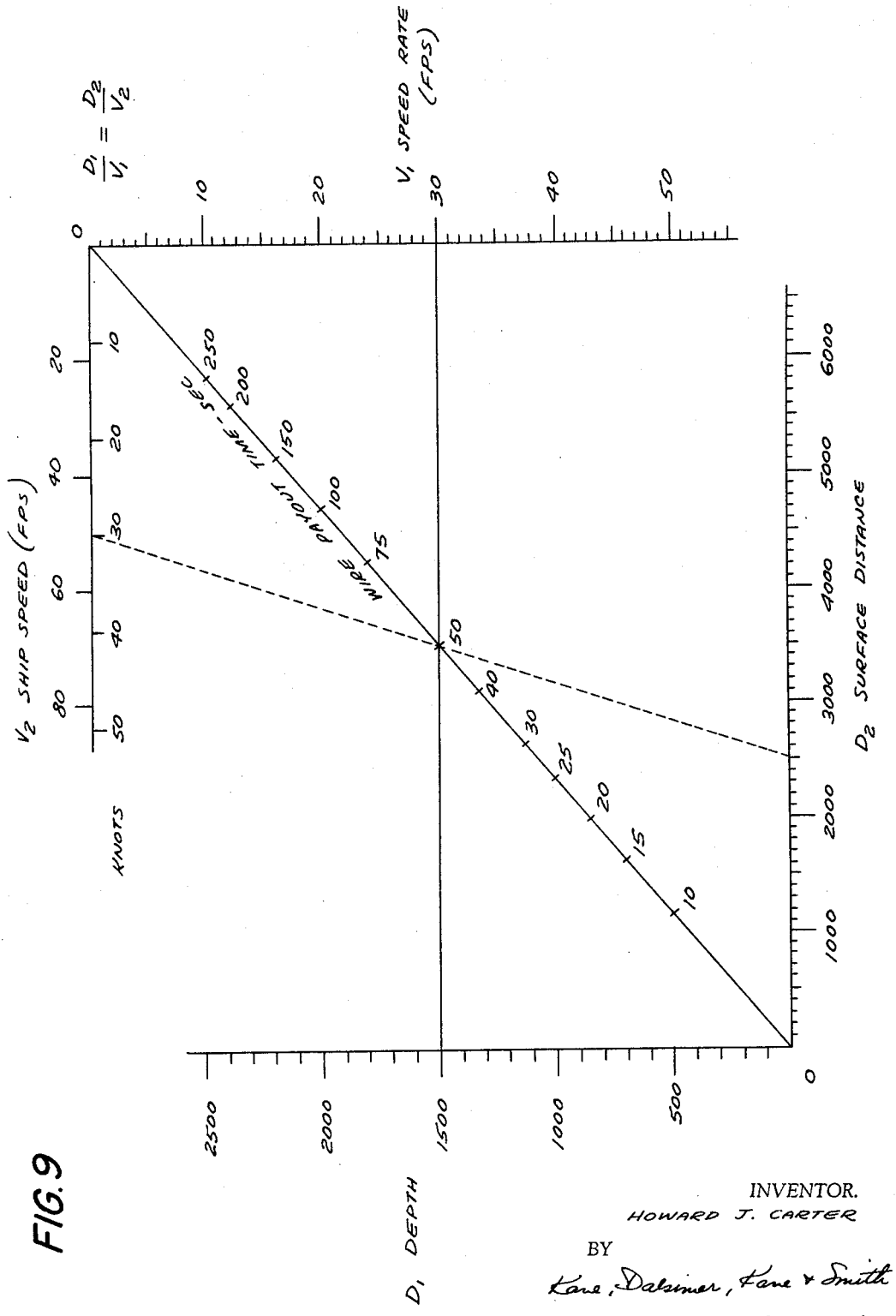
FIG. 9 is a nomograph type chart to establish the relationship between sinking-rate, the depth, the drop time or pay-out time, wire spool lengths, the ship speed and the surface travel by the ship subsequent to dropping the vehicle.

If reference is made now to the nomograph of FIG. 9, various considerations and factors concerning the operational considerations will at once be apparent. The nomograph provides an adjunct to the operation and aids in the use of the system. The nomograph is primarily to relate all of surface or ship speed, the sinking rate of the vehicle, the depth to which the vehicle sinks, the surface distance travelled by the ship and the wire pay-out time. The relationship between the pairs of variables, namely time and distance, are shown both by solid lines and dash lines, respectively. In considering this diagram, the generally horizontally drawn solid line relates the sinking rate and the depth to which the dropped instrument sinks. In preparing the diagram, the operator first chooses the depth to which the vehicle is to sink, as shown at the left side ordinate. Next, the normal rate of sinking of the vehicle (usually a known factor) is selected at the appropriate point on the righthand ordinate (extending downwardly). A solid line is drawn between these two points. Next, there is a diagonal line drawn between the intersection of the ordinate and abscissa lines at the bottom of the nomograph (lower lefthand corner) and the intersection of the abscissa line at the top of the chart and the vertical ordinate extending downwardly at the right of the graph. This line, with the indicated spacing, may be considered to indicate the wire pay-out time, say, in seconds. With this information plotted, for any given ship speed, a line, such as that shown by the dash line, may be drawn from the appropriate point on the upper abscissa through the point of intersection of the two solid lines. If this dash line is then extended to the scale $D_2$, representing surface distance travel by the ship from the time of drop, the point of intersection with the lower abscissa will then immediately designate the length of wire removed from the spool or reel on the ship. By adding together the amount of wire needed to reach the desired depth $D_1$ and the amount of wire necessary to cover the surface distance $D_2$, the total wire required is readily ascertainable. There is a relationship between the depth D, to the sinking rate V, in feet per second which corresponds to the relationship between the distance $D_2$ travelled by the ship over the water surface to the velocity $V_2$ of ship movement in feet per second or in knots per hour. The relationship is most readily noted by the equation $D_1/V_1 = D_2/V_2$.

FIG. 8 (not previously discussed in detail) shows a schematic representation of the entire system with legends attached. The vehicle 11 includes, as already stated, the pressure depth-sensing Bourdon component 27 and the temperature-sensing "thermistor" component 33. The functioning of these two components and the manner of transmitting the signalling information has been above discussed. Suffice it therefore to set out the wire spool 46 of the vehicle attaches via the conductor 18 (forming a part of the continuous wire) into the wire spool 75 contained on shipboard. Each of the spools feeds out wire in the general fashion depicted by the vehicle of FIG. 6a. On shipboard, provisions are made for supplying power to the circuit from a power supply and also for providing for signalling conditioning and recording, all as above explained.

Various modifications of the invention may be made without departing from its spirit and scope and, therefore, the foregoing description, while representing the preferred and best method of practicing the invention, is subject to modifications where such modifications clearly follow very closely what is set forth.

Having now described the invention, what is claimed is:

1. A vehicle for oceanographic apparatus to sense temperature of the water body and related depth to which the vehicle is adapted to be immersed comprising a casing element, pressure-responsive means positioned within the vehicle, temperature responsive means supported by the wall of the vehicle for directly contacting the water body and sensing the instantaneous temperature thereof, a storage spool of electrically conducting wire contained within the casing, means to establish a connection between one end of the said wire of the spool and the temperature responsive means, means provided by the pressure-responsive means for interrupting the periods of connection, and means for releasing the wire from the spool concurrently with casing immersion to progressively increasing depth within the water body.

2. A vehicle for oceanographic apparatus to sense temperature of the water body and related depth to which the vehicle is adapted to be immersed comprising a casing element, means in the casing to accelerate the sinking rate and direct the submersion path within the water body substantially in a vertical direction, pressure-responsive means positioned within the vehicle, temperature responsive means supported by the wall of the vehicle for directly contacting the water body and sensing the instantaneous temperature thereof, a storage spool of electrically conducting wire contained within the casing, means to establish a connection between one end of the said wire of the spool and the temperature responsive means, means provided by the pressure-responsive means for interrupting the periods of connection, and means for releasing the wire from the spool concurrently with casing immersion to progressively increasing depth within the water body.

3. A vehicle as claimed in claim 2 including, in addition, means provided by the sinking accelerating means for establishing an electrical connection through the water body to a remote point for recording measurements.

4. A vehicle as claimed in claim 2 including, in addition, means to establish an electrical connection between the temperature and pressure-responsive means and the vehicle casing whereby to complete an electrical circuit from the casing through the water to a recording point.

5. A vehicle as claimed in claim 2 comprising, in addition, a plurality of spaced partitions to separate the casing into a plurality of sectional chambers, one of the chambers including the wire-carrying spool, a second of the chambers including the pressure-responsive means, said chamber last named having therein a plurality of openings extending through the casing wall for providing fast-flooding, a pliable closed covering surrounding its housing chamber and having therein a fluid filling thereby to establish pressure changes upon said pressure-responsive means through the filling proportioned to the instantaneous depth of the casing within the water body.

6. A vehicle as claimed in claim 2 wherein the sinking accelerating means comprises a noseweight to maintain the casing during sinking within the water body in a position substantially vertical above the noseweight and wherein the fast-flooding chamber has a plurality of elongated water entry passages for introducing water into the chamber and thereby stabilizing the immersion path of the casing, and means to provide external static pressure effects upon the fluid within the chamber section containing the pressure-responsive means, whereby the pressure effective therein is established by the instantaneous depth of the casing below the water surface.

7. A vehicle for oceanographic apparatus to sense depth and temperature of the water body in which the vehicle is adapted to be immersed comprising a casing element for the vehicle, pressure-responsive means positioned within the casing to produce indications of depth, temperature-responsive means supported by the casing for contacting the water body to produce indications of the instantaneous temperature thereof, a storage spool of electrically conducting wire contained within the casing, means for measuring the produced depth and temperature indications by converting each into signal information, means for changing the period of representation of each signal series under control of the pressure-responsive means, means for selectively returning to a datum position at known positions in the signal series production, a connection between one end of the said wire of the spool and the pressure and temperature resolving means, and means for releasing the wire from the spool concurrently with casing immersion to progressively increasing depth within the water body.

8. A vehicle for oceanographic apparatus to sense the temperature of a water body as related to water depth in which the vehicle is adapted to be immersed comprising a casing element, pressure responsive means positioned within the casing, temperature responsive means supported by the casing for contacting the water body and producing controlled changing resistance indications of the instantaneous temperature thereof, commutating means having a pair of electrically conducting sections intermeshed relative to each other with the sections separated in intermeshing regions by a non-conducting section, a connection from the temperature sensing means to one of the sections of the commutator thereby to include therewith a resistance element variable with temperature change, a storage spool of electrically conductive wire contained within the casing, a pointer connected to the pressure responsive means to be moved across the commutator sections when pressure changes occur, a connection between one end of the conducting wire of the spool and the pointer means, means provided by the pointer to supply to the wire signal information indicative of temperature as related to pressure, and means for releasing the wire from the spool concurrently with casing immersion to progressively increasing depth within the water body.

9. A vehicle for oceanographic apparatus to sense depth and temperature of a water body in which the vehicle is adapted to be immersed comprising a casing element, pressure responsive means positioned within the casing, a pliable container within the vehicle for housing the pressure-responsive means, means to introduce static pressure changes to become effective against the pliable container, a fluid filling within the container within which the pressure-responsive means is supported thereby to apply pressure changes to the pressure-responsive means, temperature responsive means supported by the casing in a position for establishing continous contact with the water body and producing controlled changing resistance indications of the instantaneous temperature thereof, commutating means having a pair of electrically conducting sections intermeshed relative to each other with the sections separated in intermeshing regions by a non-conducting section, a connection from the temperature sensing means to one of the sections of the commutator thereby to include therewith a resistance element variable with temperature change, a connection between the other conducting sections and a known resistance, a storage spool of electrically conductive wire contained within the casing, a pointer connected to be moved across the commutator sections when pressure changes occur, a connection between one end of the conducting wire of the spool and the pointer means, means provided by the pointer to supply to the wire signal information indicative of temperature as changing with pressure, and means for releasing the wire from the spool concurrently with casing immersion to progressively increasing depth within the water body.

10. A pressure responsive element comprising a coiled tubular member, means for fixing the location of one end of the coiled member, a pointer secured at substantially the free end of the coiled member and means for introducing into the tubular member and sealing within it gas under pressure whereby in the absence of external pressure different from atmospheric pressure applied to the coiled member a pressure tending to change the coil expansion and contraction relative to its condition with equalized external and internal pressure occurs, the coil being adapted to return to substantially its normal coiled state as the external and internal pressure approaches equalization, a conducting commutator member positioned to be contacted by the pointer secured to the coil member, said commutator member comprising a pair of arcuate conducting members each having a plurality of teeth and slots and each supported to be in intermeshing relationship, the teeth and slots of the two members being of an unequal number so that selected slots of one of the members are free of teeth of the other member, and the width of the teeth of one of the sections being progressively changed from one end to the other, an insulating region filling the slot portion, and means to connect an external circuit to each of the conducting members.

11. The element claimed in claim 10 wherein the interior of the coil is pressurized above atmospheric and the coil is expanded and restricted to a maximum extent and merely with increased external pressure the external and internal pressures approach equalization and the coil is twisted toward a minimum state.

12. The device claimed in claim 11 comprising, in addition, a pliable covering surrounding the coiled member, means to seal the coiled member and an oil filling within the pliable covering, and means to apply external pressure upon the coiled member through the oil filling contained within the pliable covering.

13. A pressure and temperature indicator comprising a plurality of groups of intermeshed conducting segments with adjacent intermeshed sections separated by insulating regions, the conducting members having slotted and toothed segments in intermeshing relationship, means for moving a conducting member transversely of the group of elements to contact the conducting segments in sequence and to have the contact interrupted with each transverse passage over each of the insulating segments, means connecting the conductive segments of one group to an external circuit to include a resistor of fixed value and means connecting a resistor of variable value to the conducting segments of the other group whereby traverse of the contact member across the segments establishes a pattern returning to an open circuit state at each traverse of an insulating section and to a fixed level state at each traverse of one of the sections and to a variable level for each traverse of the other of the sections, and means responsive to said signalling connections to produce a record of the changing values.

References Cited

UNITED STATES PATENTS

| | | |
|---|---|---|
| 3,359,801 | 12/1967 | Rasmussen. |
| 576,208 | 2/1897 | Lozier. |
| 2,679,757 | 6/1954 | Fay. |
| 2,819,615 | 1/1958 | Colt. |
| 3,221,556 | 12/1965 | Campbell et al. |
| 3,273,111 | 9/1966 | Parenti. |
| 3,286,521 | 11/1966 | Stout _____ 73—189 |
| 3,301,064 | 1/1967 | Kisling _____ 73—395 |

RICHARD C. QUEISSER, *Primary Examiner.*

JERRY W. MYRACLE, *Assistant Examiner.*